Patented Sept. 7, 1948

2,448,942

UNITED STATES PATENT OFFICE 2,448,942

ALKYLATION OF PHENOLIC COMPOUNDS

De Loss E. Winkler and Robert H. Mortimer, Berkeley, Calif., assignors to Shell Development Company, San Francisco, Calif., a corporation of Delaware No Drawing. Application May 9, 1944, Serial No. 534,816

13 Claims. (Cl. 260—621)

This invention relates to a process for the introduction of hydrocarbon radicals into the aromatic nuclei of phenolic compounds. More particularly it provides a method for a continuous vapor phase reaction of a phenolic compound with an alcohol or an ether at a superatmospheric pressure in the presence of a suitable catalyst to produce substituted phenolic compounds.

An object of the invention is to provide a speedy, economical and efficient method for adding one or more hydrocarbon radicals to phenol, cresols, xylenols, catechols, resorcinols, pyrogallols, hydroquinones, naphthols and other phenolic compounds. In one of its most specific embodiments, the invention is directed to a process for the reaction of methyl alcohol with phenol, xylenol, or cresols to produce pentamethylphenol.

It has been found advantageous to prepare a substituted phenolic compound by reacting a phenolic compound with an alcohol or an ether in a vapor phase reaction in the presence of a metal oxide condensation catalyst at a superatmospheric pressure. For example, by this process phenol may be converted to cresols, xylenols, trimethyl-, tetramethyl-, or pentamethylphenol; cresols, and xylenols may be converted to trimethyl-, tetramethyl- or pentamethylphenol; resorcinol may be converted to monoethyl-, diethyl-, triethyl-, or tetraethylresorcinol; pyrogallol may be converted to monobutyl-, dibutyl- or tributylpyrogallol; and so forth. The process of the invention is particularly advantageous for the preparation of phenolic compounds substituted by three or more hydrocarbon radicals, and has been found especially efficient for the preparation of penta-substituted phenolic compounds.

The phenolic reactant may be a monohydric or polyhydric phenolic compound wherein one or more positions in the nucleus are open for the introduction of a hydrocarbon radical. Representative phenolic compounds which may be reacted according to the process of the invention include phenol, the cresols, the xylenols, thymol, naphthol, o-phenylphenol, p-phenylphenol, resorcinol, guaiacol, pseudocumenol, carvacrol, pyrocatechol, quinol, orcinol, phloroglucinol, pyrogallol, hydroxyquinol, anthranol, phenanthrol, hydroxyquinoline, flavol and the like. It is to be understood that any mixture of the above compounds may serve as a starting reactant. For example it has been found convenient to use a mixture of cresols, xylenols, and the like such as is found in the commercial product known as cresylic acid, e. g., petroleum cresylic acids.

Another phenolic compound it has been found convenient to use is 3,5-xylenol.

It has been noted in the methylation of phenol with methanol that the ortho positions are the most easily methylated, the para position becomes methylated next, and that the meta positions are the most difficult to substitute. Therefore it would be impractical to try to obtain 2,3,5-trimethylphenol or 2,3,5,6-tetramethylphenol using phenol as a starting reactant. Since 2,3,5-trimethylphenol is valuable for use in preparing vitamins, and since 2,3,5,6-tetramethylphenol finds use as a valuable intermediate in organic syntheses and is extremely expensive, it is of value to find a convenient, economical process for obtaining them. This may be done by using as a starting reactant 3,5-xylenol which already contains two methyl groups in the meta positions. Depending upon the mole ratio of methanol to xylenol in the reaction mixture, 2,3,5-trimethylphenol and/or 2,3,5,6-tetramethylphenol as well as pentamethylphenol may be prepared in high yields according to the process of the invention.

The compound which may be employed as the source of the hydrocarbon radicals to be introduced into the phenolic compound may be represented by the formula R—O—R' wherein R is a hydrocarbon radical and R' is a hydrogen atom or a hydrocarobn radical. Representative hydrocarbon radicals which R and R' may represent are the alkyl, alkenyl, aryl, alkaryl, aralkyl, cycloalkyl, cycloalkenyl, aralkenyl, and alkenaryl, radicals such as for example, methyl, ethyl, propyl, isopropyl, butyl, isobutyl, tertiary butyl, amyl, isoamyl, hexyl, cyclohexyl, cyclohexenyl, phenyl, benzyl, isophoryl, vinyl, allyl, butenyl, and butadienyl, and the like and their homologues. In the above formula R' is preferably selected from the group consisting of the hydrogen atom and the saturated aliphatic hydrocarbon radicals, and R is preferably a saturated aliphatic hydrocarbon radical such as methyl, ethyl, propyl, isopropyl, butyl, isobutyl, tertiary butyl, amyl, the isoamyl, hexyl, heptyl, octyl, nonyl, decyl, undecyl, lauryl and cetyl radicals, etc. When R' is the hydrogen atom, the alkylating agent is an alcohol, and when R' is a hydrocarbon radical, the alkylating agent is an ether.

The alcohols which may be employed in the process of this invention include the saturated or unsaturated aliphatic, cycloaliphatic or aromatic alcohols. Representative alcohols are the methyl, ethyl, propyl, isopropyl, butyl, isobutyl, tertiary butyl, amyl, the isoamyl, hexyl, heptyl, octyl, nonyl, decyl, undecyl, lauryl, cetyl, cyclohexyl, cyclohexenyl, allyl methylvinylcarbinyl, methallyl, tiglyl, cinnamyl, benzyl and isophoryl alcohols, and the like and their homologues. A particularly suitable group of alcohols for use in accordance with the process of the invention is that group which contains the saturated aliphatic alcohols such as methyl, ethyl, propyl, butyl, isopropyl, isobutyl, tertiary butyl, amyl and hexyl alcohols, etc.

Representative of the ethers which may be used are the symmetrical or mixed aliphatic ethers, aryl ethers, the aryl alkyl ethers, and the ethers containing cycloaliphatic radicals. Among the various ethers which may satisfactorily be employed are the methyl vinyl ether, ethyl phenyl ether, diphenyl ether, anisole, diallyl ether, diisophoryl ether, and the like. It has been found convenient to use the saturated aliphatic ethers, particularly the symmetrical saturated aliphatic ethers such as the dimethyl, diethyl, dipropyl, diisopropyl, dibutyl, diisobutyl, di-tertiary butyl, diamyl, diisoamyl, dihexyl, and diheptyl ethers, and the like and their homologues.

The condensation catalysts which may be used in the execution of the process of the invention are selected from the group comprising the metal oxides such as aluminum oxide, thorium oxide, zirconium oxide, zinc oxide, iron oxide, chromium oxide, manganese oxide, magnesium oxide, calcium oxide, barium oxide, etc. The catalyst may be a solid substance which has an active surface due to its chemical nature and/or to its degree of subdivision or amount of available reaction surface. The catalyst may be in the form of a fine powder, in the form of pellets or other formed pieces of suitable size, or it may be in the form of fragments of suitable size. Single catalysts or mixtures of different catalysts may be employed, and they may be used with or without promoters and/or active or inert supports such as pumice, silica gel, activated charcoal, kieselguhr, etc. It has been found that catalysts containing a substantial amount of aluminum oxide are particularly suitable for effecting the reaction of phenolic compounds with an alcohol or an ether in accordance with the process of the invention. Especially suitable is a catalyst consisting of or comprising an activated alumina, i. e., an adsorptive alumina, which consists predominantly of alumina alpha monohydrate and/or gamma alumina, and which may or may not be impregnated with or contain some other suitable substance, e. g., activated alumina impregnated with lesser amounts of ferric oxide. Alumina catalysts which are characterized by their highly active adsorptive properties may be obtained from natural sources or they may be prepared by synthetic means. An efficient catalyst may be prepared by treatment of natural bauxite ore. It is generally known that bauxites have different physical and chemical characteristics, depending upon the locale from which they are obtained and upon the subsequent treatment accorded them. For example, the calcination temperature has a decided effect on the surface area and the adsorptive capacity of the resultant catalyst; the iron which is present may be capable of removal by magnetic methods, so the iron content may vary within wide limits, depending on the specific treatment; and the water content of a bauxite varies according to the degree of calcination employed. Certain selected bauxites, such as the activated bauxite sold in the trade by the Porocel Corporation under the trade name "Porocel" are particularly efficient and in fact comprise one of the preferred catalysts to be employed in the present process, not only because they result in highly improved yields, but also because of the considerably lower cost of such bauxites. A selected activated bauxite such as Porocel possesses a long catalyst life as well as the ability to bring about excellent conversions to the alkylated phenolic products. The selected activated bauxite sold under the trade name of "Porocel," as well as the adsorptive aluminas having the general physical and chemical characteristics of Porocel, are particularly suitable as catalysts for the reaction of an alcohol or an ether with a phenolic compound to produce the corresponding substituted phenolic compound.

Other suitable catalysts consist of or comprise activated or adsorptive aluminas prepared by synthetic means. These synthetic aluminas may be prepared from gels which may be peptized or unpeptized, but they are preferably prepared from the crystalline form such as the crystalline alpha alumina trihydrate crystallized from alkali aluminate solutions. A well known activated alumina is that sold by the Aluminum Ore Company under the trade name "Alorco" (grade A). A variety of suitable means for activating alumina are in existence, such as the ones described in U. S. Patents 1,868,869 and 2,015,593. The process of the U. S. Patent 1,868,869 comprises subjecting to calcination, at a temperature of from 300° C. to 800° C., the deposit which forms in the precipitation tanks and discharge pipes used in the execution of the Fickes-Sherwin modification of the Bayer process. Other suitable methods of preparing and activating the alumina catalyst will be apparent to those skilled in the art.

As has been stated above, if desired, a catalyst may be used comprising an activated alumina and some other suitable metal or metal compound such as the metal oxides mentioned above which may or may not be in chemical combination with the activated alumina on the surface thereof. Some of these catalysts may be prepared by direct impregnation of the activated alumina with a solution of the compound which it is desired to incorporate in the surface thereof, while others can only be prepared indirectly, for example, by impregnation with one compound followed by a conversion treatment whereby said compound is converted to the desired compound.

The conditions under which the reaction is to be effected according to the process of the invention must be such that the reaction takes place in the vapor phase at a superatmospheric pressure. By a superatmospheric pressure is meant a pressure above atmospheric of at least about 2 atmospheres. The pressure must not be equal to or above that pressure at which the reactants exist in the liquid phase at the particular temperature maintained, and is preferably below about 100 atmospheres. A pressure higher than about 100 atmospheres is undesirable because it interferes with the desired reaction, resulting in the formation of little or none of the more highly alkylated phenolic products. A superatmospheric pressure is essential to the execution of the process of the invention because it increases the yield of the desired alkylated phenolic products and it has been found to have a marked inhibiting effect on the formation of alkylated hydrocarbon by-products. For example, when "cresylic acids," phenol or xylenol are alkylated with methanol, a superatmospheric pressure is necessary to help inhibit the formation of hexamethyl benzene and thus increase the yield of methylated phenols. In most cases it has been found satisfactory to maintain a pressure of at least about 10 atmospheres, for example, from about 10 to about 20 atmospheres, particularly when the temperature is in the range of from about 350° C. to about 450° C.

Since the reactants must be in the vapor phase at a superatmospheric pressure, the temperature must be at least above the boiling point of the reactants. It has been found that for superior results it is convenient to use temperatures in the range of from about 300° C. to about 450° C., particularly when a monohydric monocyclic phenolic compound is undergoing alkylation, and particularly when tetra- and penta-alkylated products are desired. However, lower or higher temperatures may be used if desired. Temperatures below about 350° C. tend to decrease the conversion to the more highly alkylated phenolic products, and in the cases when alcohols are employed as the alkylating agents, the production of ether by-products is increased, lowering the efficiency of the reaction. A temperature above about 430° C. is less desirable since it decreases the yield of the desired phenolic products, increases the production of gases to a large degree and shortens the process period because of carbonization or decomposition of the reactants and/or products. A high temperature above about 450° C. is undesirable also because it increases the formation of alkylated hydrocarbon by-products; for example when methanol is reacted with phenol, a temperature higher than about 450° C. favors to a marked extent the production of hexamethyl benzene. Temperatures of about 350° C. to about 430° C. have been found particularly efficient and convenient for producing high yields, particularly when a monohydric monocyclic phenolic compound such as phenol, xylenol or a cresol is alkylated to produce the more highly alkylated phenols.

The mole ratio of the reactants would depend upon the specific reactants in any case and upon the degree of substitution desired. Either of the reactants may be in excess, although it is preferred that the alcohol or ether be in excess, particularly for the production of the more highly substituted compounds. A mole ratio of alcohol or ether to phenolic compound of about 1:1 or higher is generally necessary, and for the production of the higher substituted phenolic compounds, such as the tri-, tetra- and penta-substituted, mole ratios of about 2:1 to about 7:1 have been found satisfactory. When a penta-alkyl phenol is the desired product, mole ratios of about 3:1 to about 5:1 have given superior results.

The rate of flow of the feed may be any convenient number of moles per liter of catalyst per hour. Flows of about 10 moles per liter of catalyst per hour to about 50 moles per liter of catalyst per hour are satisfactory. It has been found that temperatures are more easily controlled with flows of about 20 moles per liter of catalyst per hour than with flows of about 30 or 40 moles per liter of catalyst per hour. These lower flows result in higher conversions, especially to the higher substituted phenols, such as pentamethylphenol.

Any suitable type apparatus may be used. One simple assembly which has been found to be useful for this vapor phase condensation is a reactor heated over its entire length, and with the first portion serving as a pre-heater for the reactants, and which is designed to operate at temperatures up to about 600° C., at pressures from atmospheric to about 35 atmospheres. This reactor contains a wire screen in the lower portion to keep the catalyst out of the cooled portion, and is provided with means for injecting the feed and for condensing and recovering the products.

The process of the invention is preferably executed in a continuous manner. The reaction may be allowed to take place for any suitable length of time, although satisfactory results have been obtained with a duration of about four to about seven hours. However, runs of shorter or longer duration, even longer than 12 hours may be executed, although these longer runs may require the addition of fresh catalyst or regeneration of the old catalyst for efficiency. It has been noted that the conversions do not vary greatly with the duration of the runs, and that the effective process period is more than ten hours, before a change or regeneration of catalyst is necessary. The catalyst may be regenerated at any convenient point in the operation by any suitable known method. If carbonaceous deposits are formed at the higher temperatures, they may be burned off, for example, in the presence of suitable oxidizing means, according to known procedure.

The phenol products boiling below that fraction containing the more highly alkylated phenols may be recycled to increase the conversion to high boiling material containing the tetra- and penta-alkylated phenols.

The substituted phenols produced by the execution of the process of this invention may be used for a variety of purposes. Certain of the alkyl phenols may be used as antiseptics and in germicidal, fungicidal and disinfectant compositions. The tri-, tetra- and penta-alkylated phenols may be used as gasoline inhibitors; for example, 2,4,6-trimethylphenol and pentamethylphenol are known to be excellent gasoline inhibitors, 2,3,5,6-tetramethylphenol may readily be nitrated with subsequent reduction to produce high yields of p-amino tetramethylphenol which might find use as a gasoline inhibitor, an antiknock additive, and as a reducing agent in photographic developers. 2,3,5-trimethylphenol finds use as an intermediate in the preparation of vitamins.

The following examples serve to illustrate the process of this invention.

*Example I*

Methanol and that fraction of petroleum cresylic acids containing phenols such as cresols and xylenols and having 95% ASTM distillation point of 220° C., in a mole ratio of about 3:1 were reacted over an activated bauxite sold under the trade name "Porocel" at a temperature of about 400° C. and a pressure of about 10 atmospheres, at a flow rate of about 20 moles per liter of catalyst per hour, for about 10 hours, using two batches of catalyst. A yield of pentamethylphenol of about 65% on a loss free basis was obtained.

*Example II*

Methanol and 3,5-xylenol in a mole ratio of about 3:1 were reacted over an activated bauxite sold under the trade name "Porocel" at a temperature of about 400° C. and a pressure of about 10 atmospheres, at a flow rate of about 20 moles per liter of catalyst per hour, for about seven hours. A 22% conversion to 2,3,5,6-tetramethylphenol, based on the xylenol fed, and a 28% conversion to pentamethylphenol was obtained.

This corresponds to a yield of about 69% of pentamethylphenol, based on the assumption of recycle of lower methylated phenols, which would be about 80% yield on a loss free basis. No hexamethyl benzene was observed.

Example III

A feed of a mole ratio of that fraction of petroleum cresylic acids containing phenols such as cresols and xylenols, and having 95% ASTM distillation point of 220° C., to commercial methanol of about 1:3 at about 400° C. and about 20 atmospheres pressure was reacted in the presence of an activated bauxite sold under the trade name "Porocel" at a flow rate of about 20 moles per liter of catalyst per hour for about four hours. A conversion to recrystallized pentamethylphenol of over 10% based on the phenol fed was obtained, and the lower methylated phenols were available for recycle.

Example IV

The vapors of that fraction of petroleum cresylic acids containing phenols such as cresols and xylenols, and having 95% ASTM distillation point of 220° C., and commercial methanol in a mole ratio of about 1:5 were reacted in the presence of an activated bauxite sold under the trade name "Porocel" at about 400° C. and at about 20 atmospheres pressure for about seven hours. A 12.5% conversion to recrystallized pentamethylphenol was obtained, and the lower methylated phenols were available for recycle.

Example V

Dimethyl ether and phenol in a mole ratio of about 2.5:1 were passed over an activated bauxite sold under the trade name "Porocel" at a temperature of about 400° C. and a pressure of about 20 atmospheres, at a flow rate of about 16 moles per liter of catalyst per hour. An 86% conversion of the ether resulted and approximately 42% of the recovered oil boiled above 130° C. at 20 mm.

Example VI

Methanol and that fraction of petroleum cresylic acids containing phenols such as cresols and xylenols, and having 95% ASTM distillation point of 220° C., in a mole ratio of about 3:1 were reacted over an activated bauxite sold under the trade name "Porocel" at a temperature of about 400° C. and a pressure of about 10 atmospheres, at a flow rate of about 20 moles per liter of catalyst per hour, for about four hours. There was obtained about a 13% conversion to pentamethylphenol recrystallized from bottoms boiling above 135° C. at 20 mm.

Example VII

The phenols boiling up to 134° C. at 20 mm. which were recovered from the run described in Example 6, were used as a feed with an amount of that fraction of petroleum cresylic acids containing phenols such as cresols and xylenols, and having 95% ASTM distillation point of 220° C., added to make a four hour run. These phenols and methanol in a 1:3 mole ratio were reacted over an activated bauxite sold under the trade name "Porocel" at about 400° C. and about 10 atmospheres pressure for about four hours, at a flow rate of about 20 moles per liter of catalyst per hour. There was obtained about 14% conversion to pentamethylphenol recrystallized from bottoms boiling above 135° C. at 20 mm.

Example VIII

Methanol and phenol in a 1:1 mole ratio were reacted over an activated bauxite sold under the trade name "Porocel" at about 350° C. and about 10 atmospheres pressure, at a flow rate of about 40 moles per liter of catalyst per hour for approximately three hours. The recovered oil contained o-cresol, 2,6-xylenol and higher phenols, plus some ethers, bottoms and unreacted phenol. These results indicate that the ortho positions are the first to be filled.

Example IX

Methanol and 3,5-xylenol in a mole ratio of about 3:1 were reacted over Porocel at about 17 atmospheres pressure and at a temperature of about 450° C. The recovered phenols had the following approximate composition

|  | Per cent |
|---|---|
| Ether | 5 |
| 3,5-xylenol | 11 |
| 2,3,5-trimethylphenol | 44 |
| 2,3,5,6-tetramethylphenol and higher | 40 |

Example X

Methanol and that fraction of petroleum cresylic acids containing phenols such as cresols and xylenols and having 95% ASTM distillation point of 220° C., in a mole ratio of about 3:1 were reacted over an activated alumina sold under the trade name of "Alorco" (Grade A) at a temperature of about 400° C. and a pressure of about 20 atmospheres, at a flow rate of about 20 moles per liter of catalyst per hour, for about 4 hours. A 90% conversion of the alcohols resulted and approximately 30% of the recovered oil boiled above 130° C. at 20 mm.

Example XI

Ethanol and phenol in about a 3:1 mole ratio were passed over an activated bauxite sold under the trade name of "Porocel," at a temperature of about 450° C. and a pressure of about 17 atmospheres, at a flow rate of about 40 moles per liter of catalyst per hour. The recovered product distilled from the boiling point of phenol to about 131° C. at 10 mm. Very little phenol was recovered unchanged.

We claim as our invention:

1. A process for the production of pentamethylphenol which comprises reacting that fraction of petroleum cresylic acids containing phenols such as cresols and xylenols and having 95% ASTM distillation point of 220° C., with methanol in a mole ratio of about 1:3 to about 1:5 at a temperature of about 400° C. and at a pressure of about 10 atmospheres in the presence of an activated bauxite.

2. A process for the production of pentamethylphenol which comprises reacting 3,5-xylenol with a substantial molar excess of dimethyl ether at a temperature of about 400° C. and at a pressure of abou 20 atmospheres in the presence of an activated bauxite.

3. A process for the methylation of a phenol which comprises reacting petroleum cresylic acids with methanol in a mole ration of about 1:3 to about 1:5 at a temperature between about 350° C. and about 430° C. at a pressure between about 10 atmospheres and about 20 atmospheres in the presence of an activated bauxite.

4. A process for the methylation of a phenol which comprises reacting phenol with dimethyl ether in a mole ratio of about 1:3 to about 1:5 at a temperature of about 400° C. and at a pressure of about 20 atmospheres in the presence of an activated bauxite.

5. A process for the production of pentamethylphenol which comprises reacting 3,5-xylenol with methanol in a mole ratio of about 1:3 to about 1:5 at a temperature of about 400° C. and at a pressure of about 10 atmospheres in the presence of an activated bauxite.

6. A process for the methylation of xylenol which comprises reacting 3,5-xylenol with methanol in a mole ratio of about 1:3 to about 1:5 at a temperature between about 350° C. and about 430° C. at a pressure between about 10 atmospheres and about 20 atmospheres in the presence of an activated bauxite.

7. A process for the alkylation of a phenol containing at least one hydrogen atom attached to the aromatic nucleus which comprises reacting the phenol with a symmetrical saturated aliphatic ether in a mole ratio of about 1:3 to about 1:5 at a temperature between about 350° C. and about 430° C. at a pressure between about 10 atmospheres and about 20 atmospheres in the presence of an activated bauxite.

8. A process for the alkylation of phenols which comprises reacting in the vapor phase petroleum cresylic acids with a saturated aliphatic alcohol in a mole ratio of about 1:3 to about 1:5 at a temperature between about 300° C. and about 450° C. at a pressure of at least about 10 atmospheres but below about 100 atmospheres in the presence of an activated bauxite.

9. A process for the alkylation of a cresol which comprises reacting in the vapor phase a cresol with a saturated aliphatic alcohol in a mole ratio of about 1:3 to about 1:5 at a temperature between about 300° C. and about 450° C. at a pressure of at least about 10 atmospheres but below about 100 atmospheres in the presence of an activated bauxite.

10. A process for the alkylation of xylenol which comprises reacting in the vapor phase 3,5-xylenol with a saturated aliphatic alcohol in a mole ratio of about 1:3 to about 1:5 at a temperature between about 300° C. and about 450° C. at a pressure of at least about 10 atmospheres in the presence of an activated bauxite.

11. A process for the alkylation of a monohydroxy phenolic compound containing at least one hydrogen atom attached to the aromatic nucleus which comprises reacting in the vapor phase the monohydroxy phenolic compound with a saturated aliphatic alcohol in a mole ratio of about 1:3 to about 1:5 at a temperature between about 300° C. and about 450° C. at a pressure of at least about 10 atmospheres but below about 100 atmospheres in the presence of a catalyst comprising an activated alumina.

12. A process for the alkylation of a phenolic compound containing at least one hydrogen atom attached to the aromatic nucleus which comprises reacting in the vapor phase the phenolic compound with a saturated aliphatic alcohol in a mole ratio of about 1:3 to about 1:5 at a pressure of at least about 10 atmospheres but below about 100 atmospheres in the presence of a catalyst comprising an activated alumina.

13. A process for the alkylation of a phenolic compound containing at least one hydrogen atom attached to the aromatic nucleus which comprises reacting in the vapor phase the phenolic compound with a member of the group consisting of the saturated aliphatic alcohols and the saturated aliphatic ethers in a mole ratio of about 1:3 to about 1:5 at a pressure of at least about 10 atmospheres but below about 100 atmospheres in the presence of a catalyst comprising an activated alumina.

DE LOSS E. WINKLER.
ROBERT H. MORTIMER.

REFERENCES CITED

The following references are of record in the file of this patent:

UNITED STATES PATENTS

| Number | Name | Date |
|---|---|---|
| 2,140,782 | Arnold | Dec. 20, 1938 |
| 2,291,804 | Gump | Aug. 4, 1942 |

OTHER REFERENCES

Chem. Abst., vol 37, col. 2723 (1943), abstract of article by Aleksandrova, in Jour. Gen. Chem., U. S. S. R., vol. 12, pages 522–4 (1942).

Chem. Abst., vol 34, col. 1002 (1940), abstract of article by Isikawa, in Science Repts., Tokyo Burnika Daigakn A3, pages 249–55 (1939).